May 6, 1941.  W. A. JOHNS  2,240,621

GEAR SHIFTING APPARATUS

Original Filed May 19, 1939  2 Sheets-Sheet 1

INVENTOR:
Winthrop A. Johns,
BY Potter, Pierce & Scheffler,
ATTORNEYS

May 6, 1941.  W. A. JOHNS  2,240,621
GEAR SHIFTING APPARATUS
Original Filed May 19, 1939   2 Sheets-Sheet 2
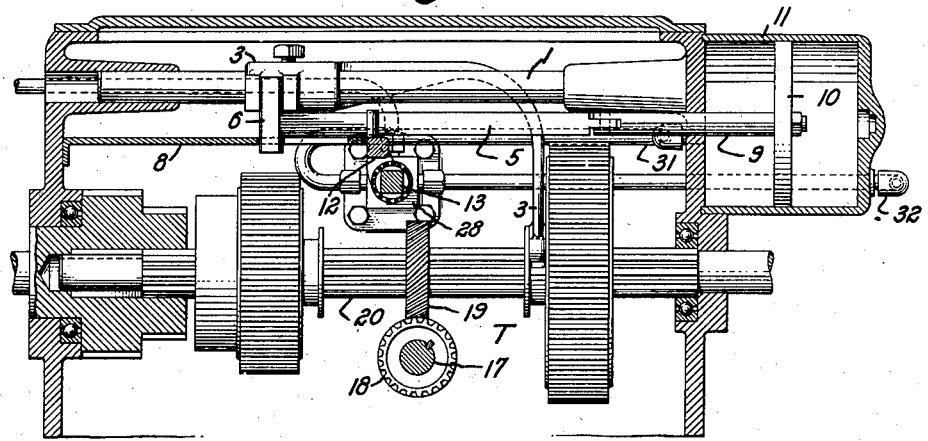
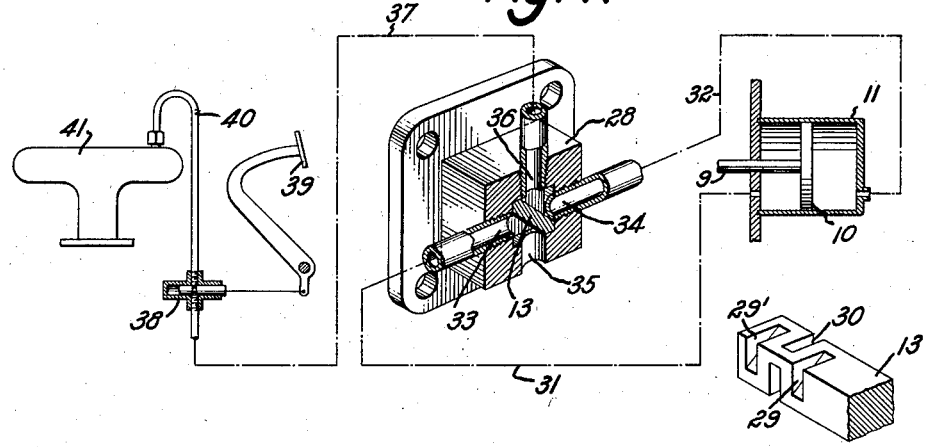
INVENTOR:
Winthrop A. Johns,
BY Potter, Pierce & Scheffler,
ATTORNEYS.

Patented May 6, 1941

2,240,621

UNITED STATES PATENT OFFICE 2,240,621

GEAR SHIFTING APPARATUS

Winthrop A. Johns, New Brunswick, N. J., assignor to Research Corporation, New York, N. Y., a corporation of New York Original application May 19, 1939, Serial No. 274,634. Divided and this application July 21, 1939, Serial No. 285,817

5 Claims. (Cl. 74—334)

This invention relates to gear shifting apparatus and particularly to apparatus for use with transmission gears such as are employed for motor vehicles and the like.

This application is a division of my copending application Serial No. 274,634, filed May 19, 1939, "Gear shifting apparatus."

An object of this invention is to provide a semi-automatic gear shifting apparatus having a fluid pressure mechanism for effecting the shift into different gear ratios when the vehicle clutch is released. An object is to provide a gear shifting apparatus including a governor responsive to vehicle speed for determining the gear train that is to be engaged and a fluid pressure actuator under control of the vehicle clutch for effecting the shift into the different gear trains. An object is to provide a semi-automatic gear shifting apparatus, for use with a transmission gear mechanism having two shift rails, which includes a governor responsive to vehicle speed for selecting the gear train that is to be engaged, and fluid pressure mechanism under control of the vehicle clutch for effecting the shifts into the selected gear trains.

These and other objects and advantages of the invention will be apparent from the following specification when taken with the accompanying drawings in which:

Fig. 3 is a fragmentary vertical section substantially on line 5—5 of Fig. 2;

Fig. 4 is a fragmentary perspective view of the governor-actuated valve bar; and Fig. 5 is a schematic view, with the valves in section, of the control mechanism.

Figure 1:
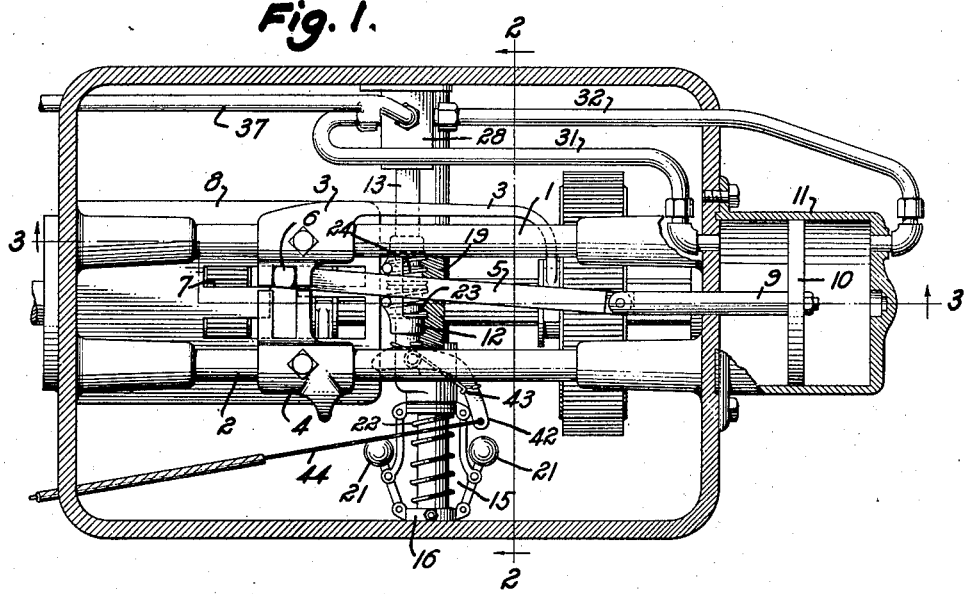
Fig. 1 is a plan view of another form of gear shifting mechanism, the cover of the gear box being omitted and some parts shown in section.

In the drawings, the transmission gears T are of conventional design and are selected in the usual manner by slide rails 1, 2 that carry forks 3, 4, respectively, for displacing the movable gear elements. Slide rail 1 controls the reverse and low speed gears and slide rail 2 controls the second and high speed gears. The actuating member of the mechanism is a shift link 5 terminating in a vertically disposed cross bar 6 having an upper end for engagement in the slotted upper ends of the forks 3, 4 and a lower end that projects into an H-slot 7 in a guide plate 8. The other end of the link 5 is pivoted to the rod 9 of a piston 10 in a cylinder 11 that is mounted on the rear end of the gear box. The pressure or suction fluid connections to the cylinder for displacing the rod 9 axially along a path between and parallel to the rails, thereby to actuate one of the shift rails, will be described later.

The shift link 5 extends through the upper forked end of a yoke 12 that is slidable on the bar end 13 of an arm 14 which is the movable member of a governor 15. The governor comprises a collar 16 fixed to a shaft 17 carrying a gear 18 in mesh with a gear 19 on the driven shaft 20 of the transmission T, weights 21 on links connecting the collar 16 to the arm 14, and a spring 22 that tends to displace the arm 14 from the collar.

A pair of coil springs 23, 24 are arranged about the bar 13 between the depending ends of the yoke 12, the springs seating between a collar 25 that is secured to the bar 13 by a pin 26 and the cups 27 that are slidable on the bar 13. The spring 23 cooperates with the governor spring 22 in tending to shift the bar to the right, Fig. 2, and the spring 24 opposes this motion.

The outer end of the square bar 13 extends into a valve casing 28 and is provided with three pairs of oblique grooves 29, 30 and 29', respectively, Fig. 4, for controlling the flow of a pressure fluid, preferably air, to the opposite ends of the cylinder 11. Pipes 31, 32 extend from the valve casing ports 33, 34, to the front and the rear ends, respectively, of the power cylinder 11, and a port 35 at the bottom of the valve casing opens to atmosphere. A port 36 at the top of the casing is connected by a pipe 37 to a slide valve 38 that is coupled to the vehicle clutch pedal 39 and moved thereby to open position when the pedal is depressed, as shown in Fig. 5; and a pipe 40 extends from the opposite side of the slide valve casing to the inlet manifold 41 of the engine. When bar 13 is in its intermediate position, as shown in Fig. 5, the grooves 30 are in line with the ports of the valve casing, thus connecting the rear end of the cylinder 11 to the engine manifold and the forward end of the cylinder to atmosphere. Displacement of the valve bar 13 into its end positions brings the grooves 29 or 29', respectively, into line with the valve ports to connect the suction line 37 to the front end of cylinder 11 through the port 33 and pipe 31, and open the rear end of the cylinder to atmosphere through the pipe 32 and port 35.

The grooves 29 and 29' thus control the forward displacement of piston 10 to effect the shift into low speed and high speed, respectively, and grooves 30 control the rearward displacement of the piston 10 for the shift into second and reverse speeds. The governor 15 functions, as will be described, to displace the valve bar 13 into its intermediate position for the shift into second speed, and a manually controlled lever 42 on the bar 13 conditions the apparatus for a shift into reverse gear. The lever 42 is normally held in the position shown in Figs. 1 and 2 by a spring 43 and may be displaced by a pull wire 44 that extends to a control member (not shown) on the instrument panel, to force the other end of the lever 42 against the yoke 12, thereby shifting the bar 13 to the left, Fig. 2.

If the cross bar 6 is in the "neutral" section of H-slot 7 when the reverse lever 42 is actuated, the shift link 5 moves to the right into the slot of fork 3 and, if another gear is engaged when lever 42 is rocked, the spring 23 is compressed to effect displacement of the shift link as soon as the cross bar 6 reaches neutral position.

Figure 2:
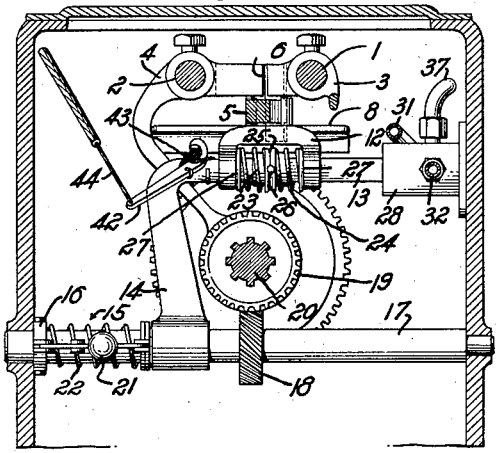
Fig. 2 is a fragmentary transverse section taken substantially on line 4—4 of Fig. 1.

Assuming that the vehicle is stationary, the governor spring 22 forces the bar 13 to the right to aline the grooves 29 with the valve casing ports. This position of the valve connects the suction pipe 37 to the pipe 31 that leads to the front end of cylinder 11 and, upon starting the engine, the piston 10 moves forward to displace shift rail 1 to engage the low speed gears. As the vehicle is accelerated, the governor displaces the arm 14 and bar 13 to the left, Fig. 2, to aline the grooves 30 of the bar 13 with the valve casing ports (as shown in Fig. 5), and to compress the spring 23, thus tending to displace the shift link 5 to the left. The engagement of the cross bar in the H-slot of plate 8 prevents this movement until, upon depressing the clutch pedal 39, the valve 38 is opened to connect the pipe 37 to the inlet manifold. The accelerator pedal is of course released when the clutch pedal is depressed, and the resultant pressure reduction in the engine manifold effects a shift of the piston 10 to move the cross bar 6 of the shift link rearwardly into the cross bar of the H-slot of the guide plate 8. The stress in the spring 23 is relieved, when the cross bar 6 reaches this neutral position, by shifting the yoke 12 to the left, Fig. 2, thus moving the cross bar 6 into the slot of the fork 4 of the slide rail 2. The direction in which the slide rail 2 is moved depends upon the vehicle speed when the clutch pedal is released to open the slide valve 38. If the vehicle speed is appropriate for operation in second speed, the stress in spring 23 is fully relieved when the yoke 12 is shifted to aline the grooves 30 of the valve bar with the valve casing ports, Fig. 5, and the piston 10 is therefore moved rearwardly to engage the second speed gears. Upon a further increase of the vehicle speed, the governor arm 14 and its bar 13 are displaced towards the left, Fig. 2, thus alining the grooves 29' of the valve bar with the valve casing ports and compressing the spring 23. The release of the vehicle clutch opens the suction line valve 38 and the pressure is reduced at the forward face of piston 10 to move the cross bar 6 of the shift link 5 forward into neutral and then into high speed position. The stress in spring 23 is relieved when the shift rail 2 reaches neutral position by displacing the yoke 12 to the left as seen in Fig. 2, or downwardly as viewed in Fig. 1, to carry the cross bar 6 more deeply into the fork 4.

The described progressive engagement of the gears takes place when the clutch is released when the vehicle speed is appropriate for a drive in second speed and released again when the vehicle speed is appropriate for a drive in high speed. If the vehicle is accelerated in the low speed gear to a value appropriate for a drive through the high speed gears, the shift is directly into high in the following manner. The displacement of the governor arm 14 is limited until the clutch pedal is released, to a distance equal to the spacing between the valve bar grooves 29 and 30. The release of the clutch and accompanying opening of the suction line valve 38 therefore result in a rearward movement of piston 10 which moves the shift link 5 and its cross bar 6 back to neutral position. The compression stress previously established in spring 23 would be relieved by a shift of the yoke 12 to carry the cross bar 6 into the outer portion of the fork 4 but, if the vehicle speed was appropriate for a drive in high speed, the governor 15 shifts the arm 14 and bar 13 further to the left, Fig. 2, as soon as the cross bar 6 reaches neutral position, thus displacing spring 23 and its abutment 25 further to the left. This follow-up action of the governor arm 14 therefore results in an increased displacement of the yoke 12 to relieve the stress in the spring 23 and in the movement of the slide bar 13 to carry the grooves 29' into line with the valve casing ports. The displacement of the piston 10 is therefore to the forward end of the cylinder 11, and the shift bar 5 is moved forwardly to shift the rail 2 into its high speed drive position.

The shift down to lower speed gears is effected in a similar manner, the spring 24 being stressed as the governor speed decreases, to displace the valve bar 13 to the right. The apparatus is set for a shift into reverse gear by pulling on the wire 44 to rock the lever 42 to force the yoke 12 and the bar 13 in opposite directions, Fig. 2, to hold the shift link 5 in engagement with the fork 3 of rail 1 and to position the grooves 30 of bar 13 in line with the valve ports. This valve setting will result in a rearward movement of the piston 10 and a corresponding rearward movement of the slide rail 1 to engage the reverse gears.

The described construction is a preferred embodiment of the invention but it is to be understood that there is considerable latitude in the relative size, shapes and relationship of the parts within the spirit of my invention as set forth in the following claims.

I claim:

1. A gear shifting apparatus for use with a change speed gear of the type including a pair of slide rails alternatively operable in the same direction from neutral positions to establish low speed and high speed ratio drives between a driving and a driven shaft, one of said slide rails being operable in the opposite direction from neutral position to establish an intermediate speed ratio drive; said apparatus comprising a shift link and means supporting the same for movement to engage one or the other of said slide rails, a reversible motor for displacing said shift link and the slide rail engaged thereby, means including a governor responsive to driven shaft speed to determine the slide rail to be engaged by the shift link upon the next adjustment of the change speed gears, control means adjustable by said governor into three operative positions to determine the direction of operation of said motor, the end positions conditioning said motor for operation in that direction which displaces a slide rail to establish a low or alternatively a high speed ratio drive, and the intermediate position of said control means conditioning said motor for operation in the opposite direction, and means operative during a drive at either the low or the high speed ratio to limit the adjustment of said control means by said governor to displacements between said intermediate position and one of said end positions.

2. A gear shifting apparatus for use with a change speed gear of the type having a pair of slide rails operable in opposite directions from neutral positions to provide a forward drive of three different speed ratios between a driving and a driven shaft; said apparatus comprising a shift link and means supporting the same for angular movement to engage one or the other of said slide rails, a reversible fluid pressure motor for imparting longitudinal movement to said shift link and thereby to the slide rail engaged by the shift link, a governor operated from said driven shaft and including a member movable through an intermediate and two end ranges of adjustment corresponding respectively to ranges of driven shaft speed for which the several speed ratio drives are appropriate, means controlled by said governor member to determine the slide rail to be engaged by the shift link upon the next adjustment of the speed ratio, valve means adjustable by said governor member to condition said motor for operation in one direction during displacement of said governor member within either of its end ranges of adjustment and to condition said motor for operation in the other direction during displacement of said valve member within its intermediate range of adjustment, and means operative during a drive at either the low speed or the high speed ratio to limit the displacement of said governor member to its intermediate range and a single end range of adjustment.

3. A gear shifting apparatus for use with a change speed gear of the type having a pair of slide rails operable in opposite directions from neutral positions to control the speed ratio between a driving and a driven shaft; said apparatus comprising a shift link between said slide rails, a fluid pressure motor having a piston rod movable axially along a path between and parallel to said slide rails, one end of said link being pivoted upon said piston rod for angular movement of the link to engage one or the other of said slide rails, means including a governor operated from driven shaft speed to determine the slide rail to be engaged by said shift link upon the next adjustment of the change speed gears; said governor including a member movable through an intermediate range and two end ranges of adjustment corresponding respectively to ranges of driven shaft speed for which different speed ratio drives are appropriate, valve means adjustable by said governor member during displacement through its intermediate range of adjustment to condition the motor for operation in one direction and during displacement through either of said end ranges of adjustment to condition the motor for operation in the other direction, means operative during a drive at either the lowest or the highest speed ratio to limit the displacement of the governor member to its intermediate range and a single end range of adjustment, and manually controlled means for controlling the energization of said motor through said valve means.

4. A semi-automatic gear shifting mechanism including a pair of slide rails selectively operable in opposite directions to control the speed ratios between a driving and a driven shaft, a shift link and power mechanism for moving the same longitudinally in opposite directions from neutral position to operate said slide rails, means locking said shift link against angular movement when displaced from its neutral position, and means responsive to the speed of the driven shaft for moving said shift link angularly when in neutral position to engage one or the other of said slide rails; said means comprising a governor responsive to the speed of the driven shaft, a bar extending transversely of said shift link, a yoke slidable on said bar and engaging said shift link, spring means opposing sliding movement of said yoke in opposite directions from a normal position on said bar, and means coupling said bar to said governor for moving the same within said yoke in accordance with the driven shaft speed, whereby said spring means is stressed to displace said yoke when the slide link returns to neutral position.

5. A semi-automatic gear shifting mechanism as claimed in claim 4, wherein said power mechanism includes means controlled by said bar for determining the direction in which said shift link is moved longitudinally.

WINTHROP A. JOHNS.